United States Patent [19]
Ohkawa et al.

[11] Patent Number: 5,569,905
[45] Date of Patent: Oct. 29, 1996

[54] LASER BEAM SCANNING APPARATUS HAVING ARRANGEMENT FOR MAINTAINING INTENSITY LEVEL OF DETECTED SIGNAL IRRESPECTIVE OF DIRECTION OF LABEL TO BE READ

[75] Inventors: Masanori Ohkawa; Kozo Yamazaki, both of Kanagawa, Japan

[73] Assignee: Fujitsu Limited, Kawasaki, Japan

[21] Appl. No.: 326,235

[22] Filed: Oct. 20, 1994

[30] Foreign Application Priority Data

Feb. 21, 1994 [JP] Japan .................................. 6-021680

[51] Int. Cl.$^6$ ............................................. G01J 1/32
[52] U.S. Cl. ...................... 250/205; 250/566; 235/467
[58] Field of Search ........................ 250/205, 566, 250/234, 235; 235/467, 462, 455; 359/201, 204, 205, 209, 216–219, 850, 857, 565; 358/493, 494

[56] References Cited

U.S. PATENT DOCUMENTS 3,619,033  11/1971  McMahon ......................... 359/565
4,594,001  6/1986  DiMatteo et al. .................. 250/205
5,288,983  2/1994  Nakazawa .......................... 235/462

FOREIGN PATENT DOCUMENTS 2-183386  7/1990  Japan .................................. 235/455

*Primary Examiner*—Que T. Le
*Attorney, Agent, or Firm*—Armstrong, Westerman, Hattori, McLeland & Naughton

[57] ABSTRACT

A laser beam scanning apparatus including a device for scanning a laser beam, and a device for changing the scanning direction of the laser beam into a plurality of different scanning directions in one of which the laser beam is attenuated in comparison to a laser beam traveling in another scanning direction. A scanning optical path detecting device detects whether or not the laser beam is being scanned in the scanning direction in which it is attenuated. The laser beam scanning apparatus further includes a device for detecting a laser beam reflected from a bar code scanned by a laser beam emanating from the scanning direction changing device, and a device for controlling the intensity of the laser beam incident on the laser beam detecting device in response to the result of detection made by the scanning optical path detecting device.

14 Claims, 10 Drawing Sheets

5,569,905

LASER BEAM SCANNING APPARATUS HAVING ARRANGEMENT FOR MAINTAINING INTENSITY LEVEL OF DETECTED SIGNAL IRRESPECTIVE OF DIRECTION OF LABEL TO BE READ

BACKGROUND OF THE INVENTION

1. Field of the Invention

The present invention relates to a laser beam scanning apparatus that scans a bar code with a laser beam and detects the laser beam reflected from the bar code.

2. Description of the Related Art

Recently, POS (Point-Of-Sales) systems have rapidly spread, which enable goods to be checked out by reading bar code information attached to them.

Since the POS systems make it possible to check out goods simply by facing them toward a read unit, the load on the operator has been reduced. As a laser beam scanning apparatus for reading bar code information in the check-out operation, a stationary scanner is mainly used.

The POS systems and other similar systems are demanded to scan a bar code with laser beams in a plurality of different directions so that goods information can be read from the bar code irrespective of the posture of the bar code in which it is faced toward the read unit.

Accordingly, the conventional practice is such that a laser beam emitted from a laser light source is reflected by a rotating polygon mirror, and a plurality of mirrors are disposed on the optical path of the reflected laser beam at different angles of inclination, thereby splitting a single laser beam into a plurality of scanning beams and directing them toward the read unit in a plurality of different directions.

However, since the volumetric capacity of the apparatus becomes considerably large depending on the number of mirrors used and the arrangement thereof, a holographic diffraction plate, which changes the direction of a laser beam by the action of diffraction, is disposed on a scanning optical path in order to minimize the overall size of the apparatus.

It should be noted that a part of the laser beam reflected from the bar code returns to the polygon mirror along the same optical path as that of the emergent beam and is then focused on a laser beam detector by a condenser lens. The laser beam detector photoelectrically converts the laser beam and outputs an electric signal. Bar code information is read from the differential waveform of the electric signal.

FIG. 15 shows an output waveform of the laser beam detector in the above-described laser beam scanning apparatus, together with the corresponding differential waveform.

As shown in the figure, the signal output (voltage) of the laser beam detector is larger during the laser beam scanning of a white bar of the bar code than during the scanning of a black bar.

In signal processing, a slice ratio for an upper limit and a limiter level for a lower limit are set. It should be noted that the limiter level is set for the purpose of eliminating the noise component. Accordingly, a component lower than the set level is neglected in the following processing.

The interval from the time the differential wave exceeds the positive limiter level until it subsequently exceeds the negative limiter level (i.e., between (a) and (b) in FIG. 15) is recognized as a black bar. The interval from the time the differential wave exceeds the negative limiter level until it subsequently exceeds the positive limiter level (i.e., between (b) and (c) in FIG. 15) is recognized as a white bar.

The course of the laser beam incident on the laser beam detector varies according to the direction of the bar code facing toward the read position: In one case, the laser beam passes through the holographic diffraction plate; in another case, it does not. In a case where the laser beam passes through the holographic diffraction plate, it passes through the plate twice, that is, when the laser beam is going to scan the bar code, and after it has been reflected from the bar code.

Since the diffraction efficiency of the holographic diffraction plate is not 100%, when the laser beam passes through it, the intensity thereof attenuates. Accordingly, when the diffraction efficiency of the holographic diffraction plate is low, the intensity of the laser beam incident on the laser beam detector becomes extremely lower than in a case where the laser beam does not pass through the holographic diffraction plate.

Consequently, if the limiter level (limiter level 1) is set relatively high, as shown in FIG. 15, all the signal information carried by the laser beam passing through the holographic diffraction plate may be cut off.

If the limiter level is set as low as the limiter level 2 in order to prevent the occurrence of the above-described problem, the noise level of the laser beam when it does not pass through the holographic diffraction plate, in which case the detected laser beam intensity is relatively high, may exceed the limiter level and be erroneously recognized as bar code information.

Thus, the margin allowed for a limiter level to be set and the margin allowed for the diffraction efficiency of the holographic diffraction plate are extremely small. Accordingly, it is difficult to arrange the apparatus so that information can be read from bar codes even more accurately.

SUMMARY OF THE INVENTION

An object of the present invention is to provide a laser beam scanning apparatus which is designed so that there is no difference in the intensity level of the signal beam incident on the laser beam detector irrespective of the direction of a bar code to be read, thereby enabling bar code information to be read even more readily and accurately.

Other objects and advantages of the present invention will become apparent from the following detailed description of illustrated embodiments of the invention.

According to the present invention, there is provided a laser beam scanning apparatus including a device for scanning a laser beam, and a device for changing the scanning direction of the laser beam into a plurality of different scanning directions in one of which the laser beam is attenuated in comparison to a laser beam traveling in another scanning direction. A scanning optical path detecting device detects whether or not the laser beam is being scanned in the scanning direction in which it is attenuated. The laser beam scanning apparatus further includes a device for detecting a laser beam reflected from a bar code scanned by a laser beam emanating from the scanning direction changing device, and a device for controlling the intensity of the laser beam incident on the laser beam detecting device in response to the result of detection made by the scanning optical path detecting device.

BRIEF DESCRIPTION OF THE DRAWINGS

The present invention may be more fully understood from the description of preferred embodiments of the invention set forth below, together with the accompanying drawings, in which.

DESCRIPTION OF THE PREFERRED EMBODIMENTS

Embodiments of the present invention will be described below in detail with reference to the accompanying drawings.

Figure 1:
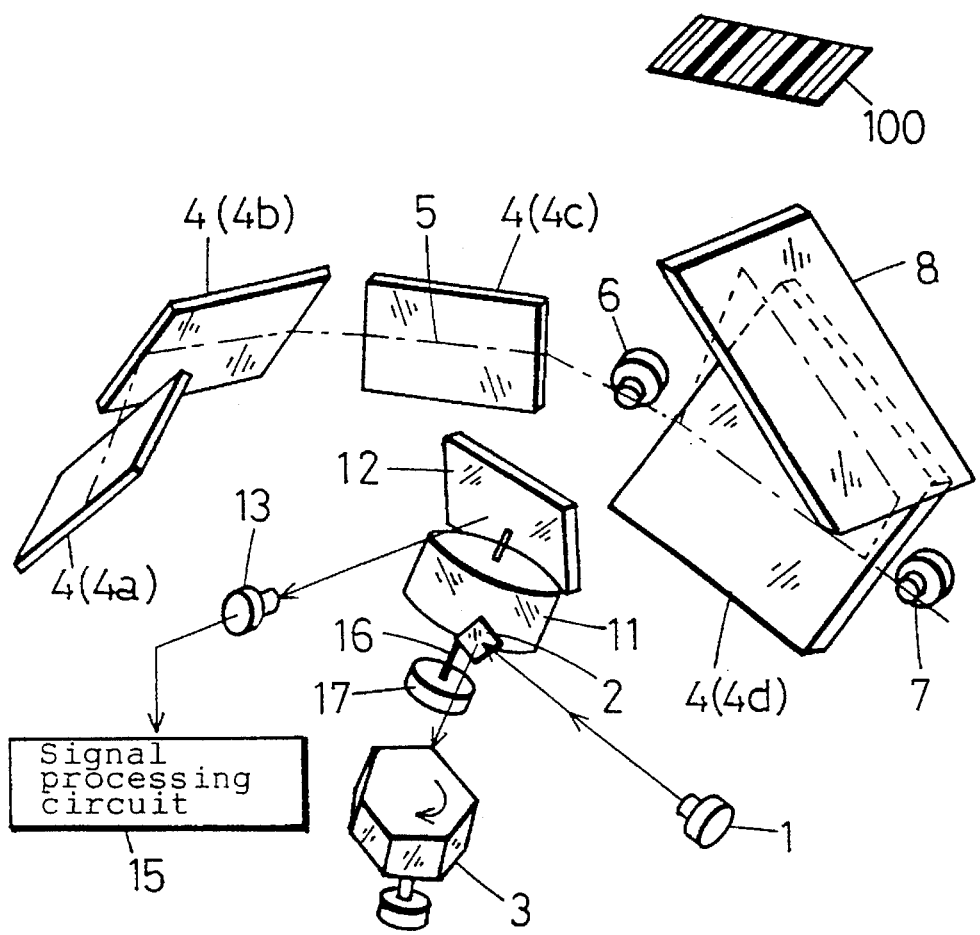
FIG. 1 is a perspective view schematically showing an essential part of a first embodiment of the present invention.

Referring to FIG. 1, a laser beam emitted from a semiconductor laser 1 is reflected by a relatively small plane mirror 2 toward a reflecting surface of a polygon mirror 3 which is driven to rotate at a predetermined angular speed.

The laser beam is reflected by the reflecting surface of the polygon mirror 3, while continuously and regularly changing the direction, toward a scanning direction changing mirror 4 composed of four relatively large plane mirrors 4a to 4d, which are arranged at different angles. Reference numeral 5 denotes a laser beam scanning line on the surfaces of the scanning direction changing mirrors 4a to 4d.

At both sides of the fourth scanning direction changing mirror 4d, a pair of first and second laser beam sensors 6 and 7 are disposed on the scanning line 5. When the laser beam is incident thereon, each of the first and second laser beam sensors 6 and 7 converts it into an electric signal and outputs it.

The laser beam is reflected by the scanning direction changing mirrors 4a to 4d toward a bar code read section in different directions to read a bar code 100 attached to goods or the like.

However, the laser beam reflected by the fourth scanning direction changing mirror 4d is incident on a holographic diffraction plate 8 having a diffraction grating formed on a transparent plate, so that the laser beam is directed toward the read unit with the scanning direction changed to a greater extent.

Figure 2:
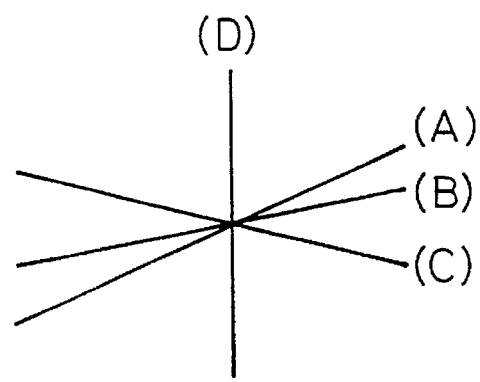
FIG. 2 shows scanning directions in the first embodiment.

As a result, in the read section, scanning is effected sequentially in different directions (A), (B), (C) and (D), as shown in FIG. 2, by the laser beams reflected from the scanning direction changing mirrors 4a and 4d. Accordingly, in whichever direction the bar code 100 faces toward the read unit, it can be scanned in a direction suitable for reading bar code information by any of the four scanning beams.

A part of the laser beam that is scatteringly reflected by the bar code 100 travels backward along the scanning optical path and is reflected by the reflecting surface of the polygon mirror 3, shown in FIG. 1. Thereafter, the reflected laser beam passes through a condenser lens 11, and while being converged by the condenser lens 11, the laser beam is reflected by a plane mirror 12 so as to converge on a light-receiving surface of a laser beam detector 13.

The laser beam detector 13 outputs an electric signal (voltage) corresponding to the intensity of the incident laser beam. The output signal is sent to a signal processing circuit 15 where it is subjected to predetermined processing to read information contained in the bar code 100.

However, when the laser beam passes through the holographic diffraction plate 8, only a quantity of laser beam corresponding to the diffraction efficiency of the holographic diffraction plate 8 travels in the scanning direction. Thus, the intensity of the scanning beam attenuates.

Since the laser beam passes through the holographic diffraction plate 8 twice, only a laser beam having an intensity corresponding to the square of the diffraction efficiency of the holographic diffraction plate 8 is incident on the laser beam detector 13. Thus, the intensity of the incident laser beam lowers considerably in comparison to the laser beam in the scanning direction in which it does not pass through the holographic diffraction plate 8.

Figure 5:
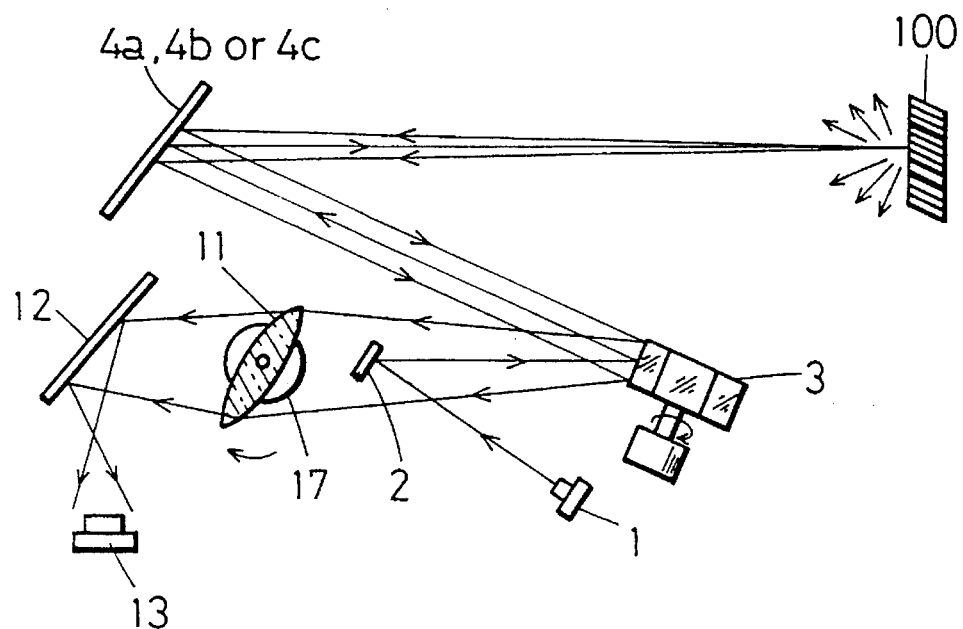
FIGS. 5 and 6 are schematic side views showing the operation of the first embodiment.
Figure 6:
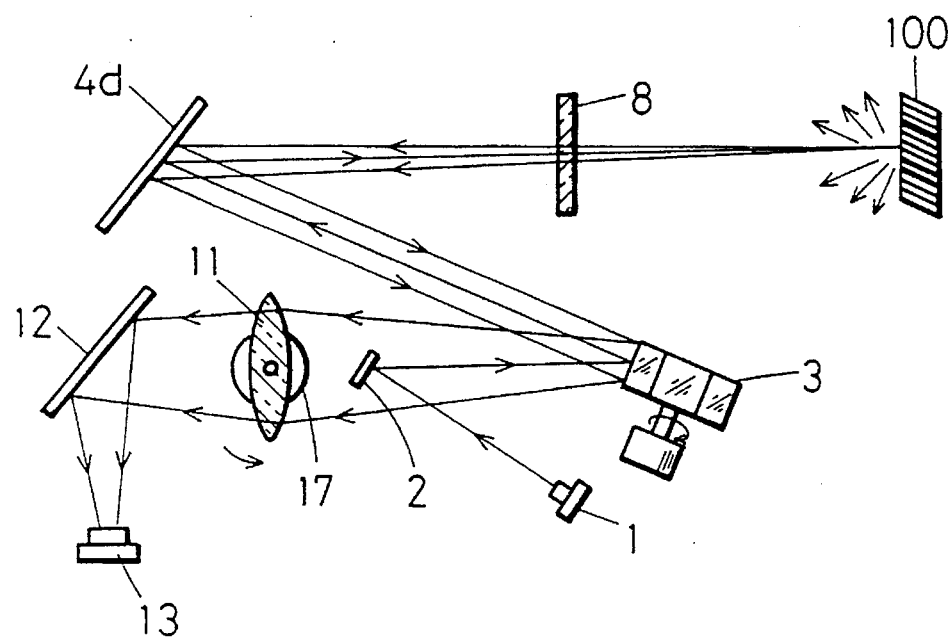

In the laser beam scanning apparatus of this embodiment, arranged as described above, the condenser lens 11 can be inclined at a predetermined angle with respect to the optical axis of the laser beam by rotating a support shaft 16 with a step motor (condenser lens inclination control motor) 17, as shown in FIGS. 5 and 6 (described later). When the condenser lens 11 is inclined as described above, the laser beam is defocused on the light-receiving surface of the laser beam detector 13, resulting in a reduction in the intensity of the incident beam.

Figure 3:
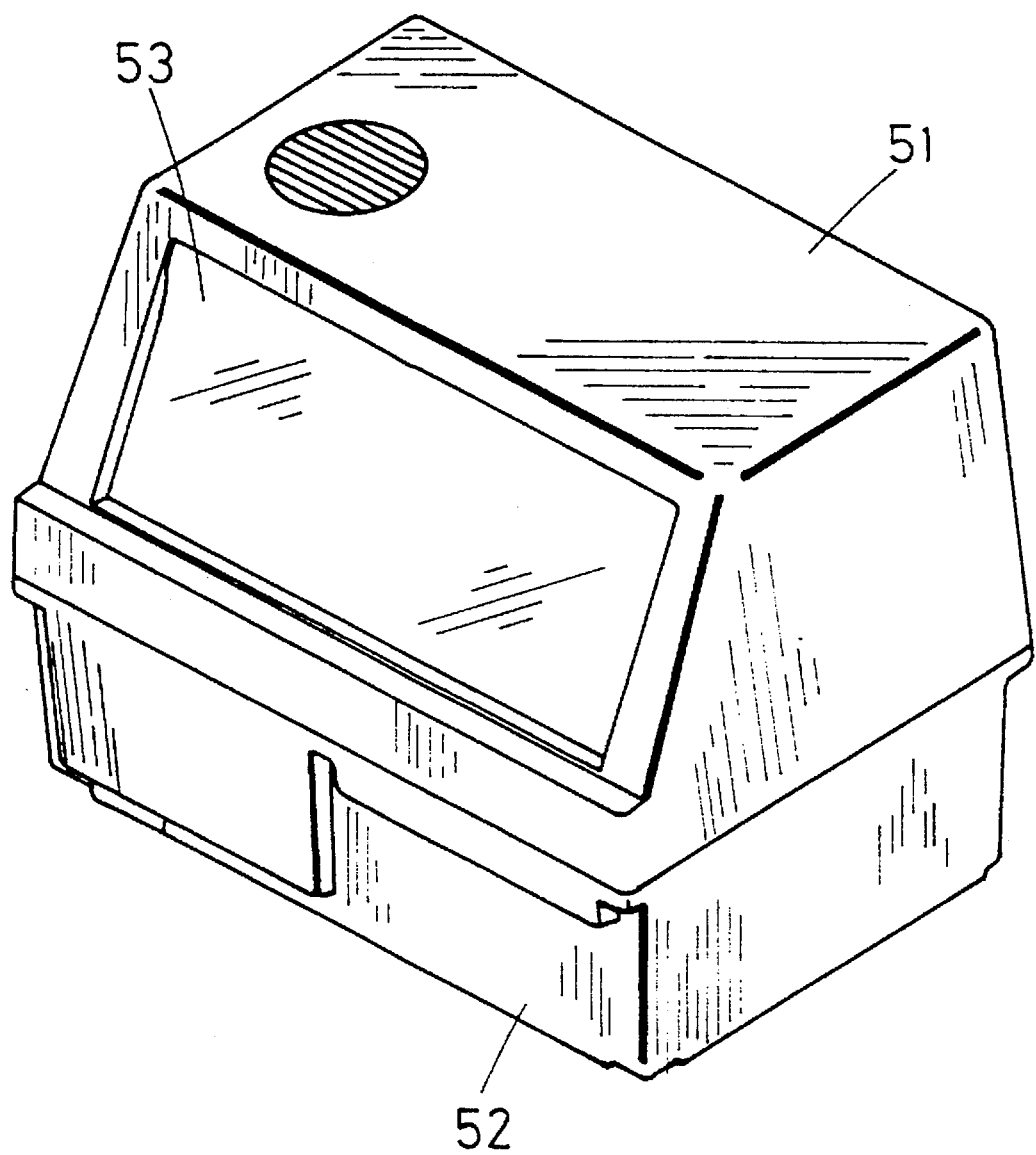
FIG. 3 is a perspective view showing the external appearance of the first embodiment.

FIG. 3 shows the external appearance of the laser beam scanning apparatus in this embodiment. The mechanism as shown in FIG. 1 is accommodated in the space surrounded by a pair of upper and lower casing members 51 and 52. The upper casing member 51 has a window glass 53 attached to the front side thereof. The outer side of the window glass 53 serves as a bar code read section. By facing the bar code 100 toward the bar code read section, it can be read through the window glass 53.

Figure 4:
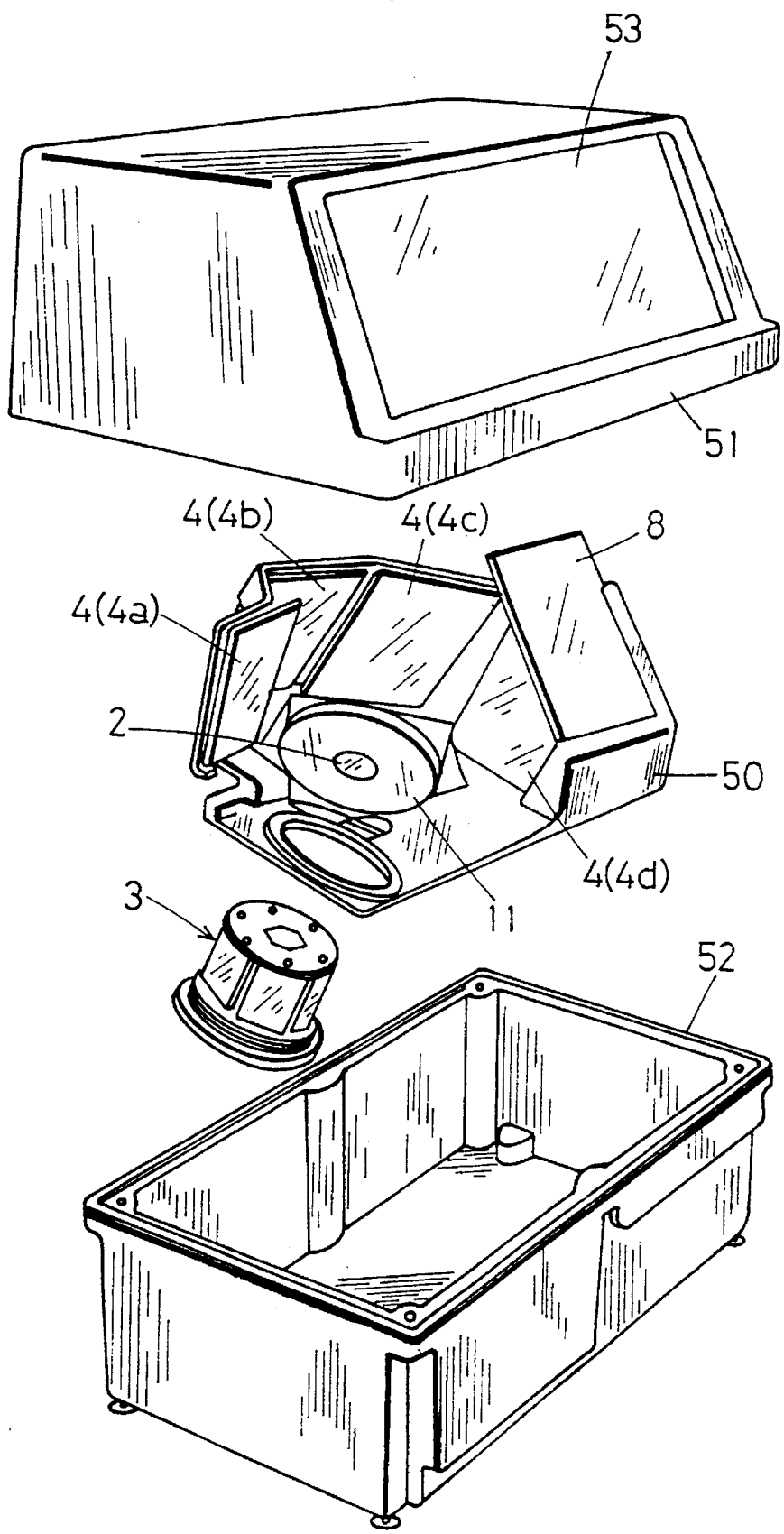
FIG. 4 is an exploded perspective view of the first embodiment.

As shown in FIG. 4, in the space defined by the upper and lower casing members 51 and 52, the scanning direction changing mirrors 4a to 4d and the holographic diffraction plate 8 are secured to a single frame 50, and the polygon mirror 3 is rotatably supported by the frame 50. Reference numeral 2 denotes a relatively small plane mirror, and 11 a condenser lens. In FIG. 4, illustration of the other components is omitted.

FIG. 5 shows a state where the condenser lens 11 is inclined with respect to the optical axis. When the scanning beam is reflected by any of the first to third scanning direction changing mirrors 4a to 4c and hence it does not pass through the holographic diffraction plate 8, the condenser lens 11 is inclined as illustrated in the figure, thereby reducing the intensity of the laser beam incident on the laser beam detector 13.

When the scanning beam is reflected by the fourth scanning direction changing mirror 4d to pass through the holographic diffraction plate 8, the condenser lens 11 is erected upright, that is, set at right angles to the optical axis of the laser beam, as shown in FIG. 6. Consequently, the laser beam is satisfactorily focused on the laser beam detector 13. There is therefore no reduction in the intensity of the laser beam incident on the laser beam detector 13.

Figure 7:
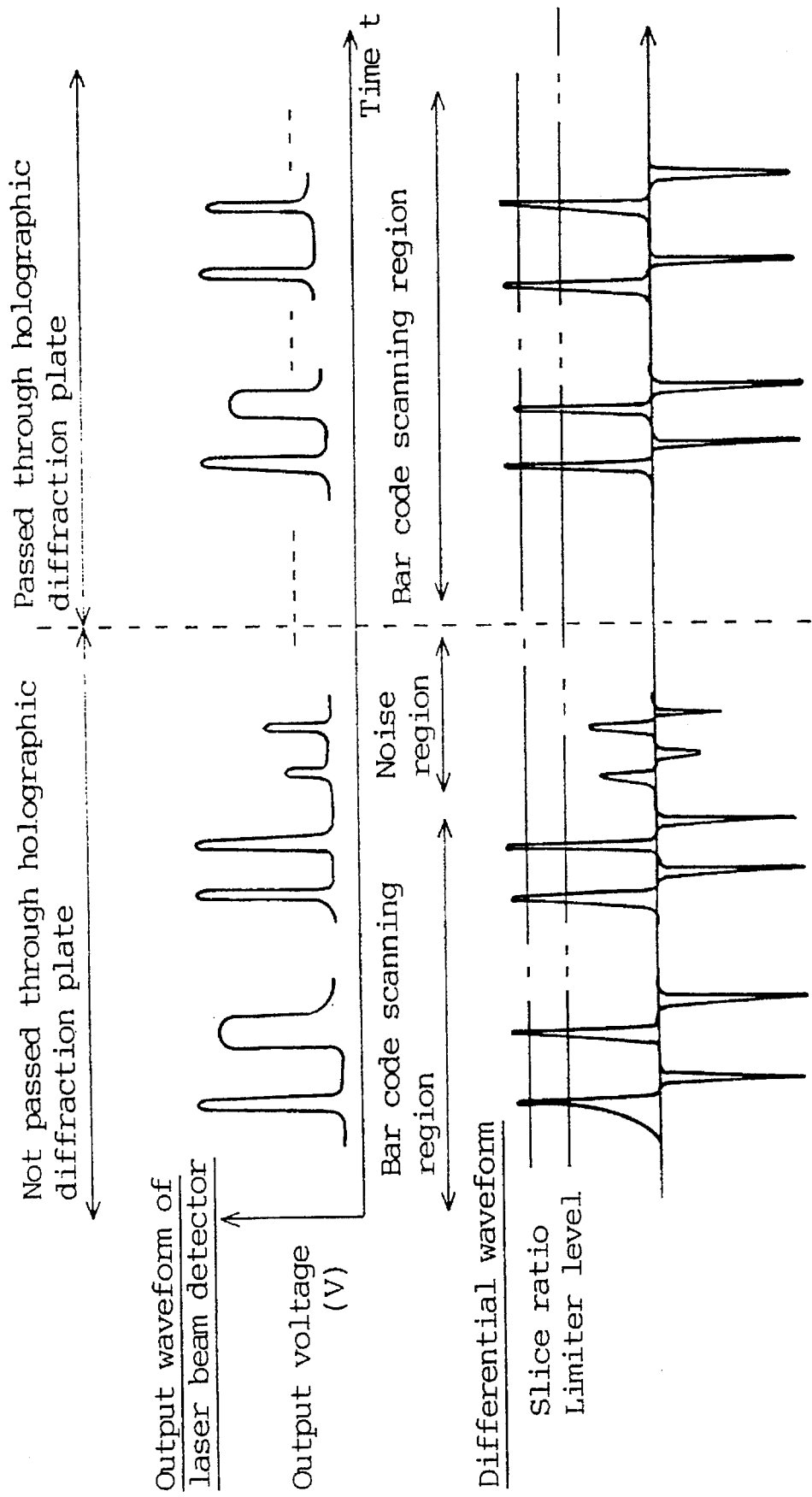
FIG. 7 shows an output signal waveform in the first embodiment.

As a result, as shown in FIG. 7, there is no difference in the intensity level of the signal beam incident on the laser beam detector 13 whether or not the laser beam for scanning the bar code 100 passes through the holographic diffraction plate 8, and the level of the noise component becomes low in distinct contrast to the signal beam.

Accordingly, error-free bar code reading can be performed without strictly setting a slice ratio and a limiter level, and it is possible to accurately effect noise elimination and bar code detection simply by setting one slice ratio and one limiter level.

Figure 8:
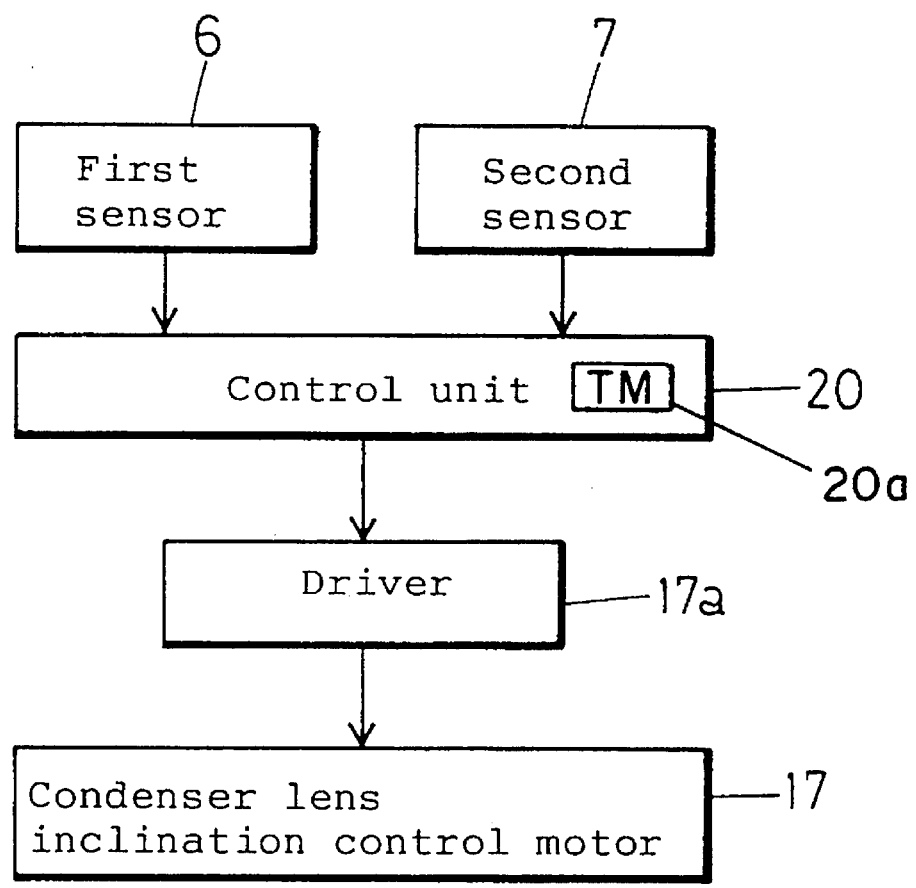
FIG. 8 is a block diagram of a control circuit in the first embodiment.

In order to erect the condenser lens 11 upright only when the laser beam passes through the holographic diffraction plate 8, as described above, control is effected as shown in FIG. 8. That is, input signals of the first and second laser beam sensors 6 and 7 are input to a control unit 20 having a built-in microprocessor or the like, and a control signal output from the control unit 20 is input to a driver 17a for the condenser lens inclination control motor 17.

Figure 9:
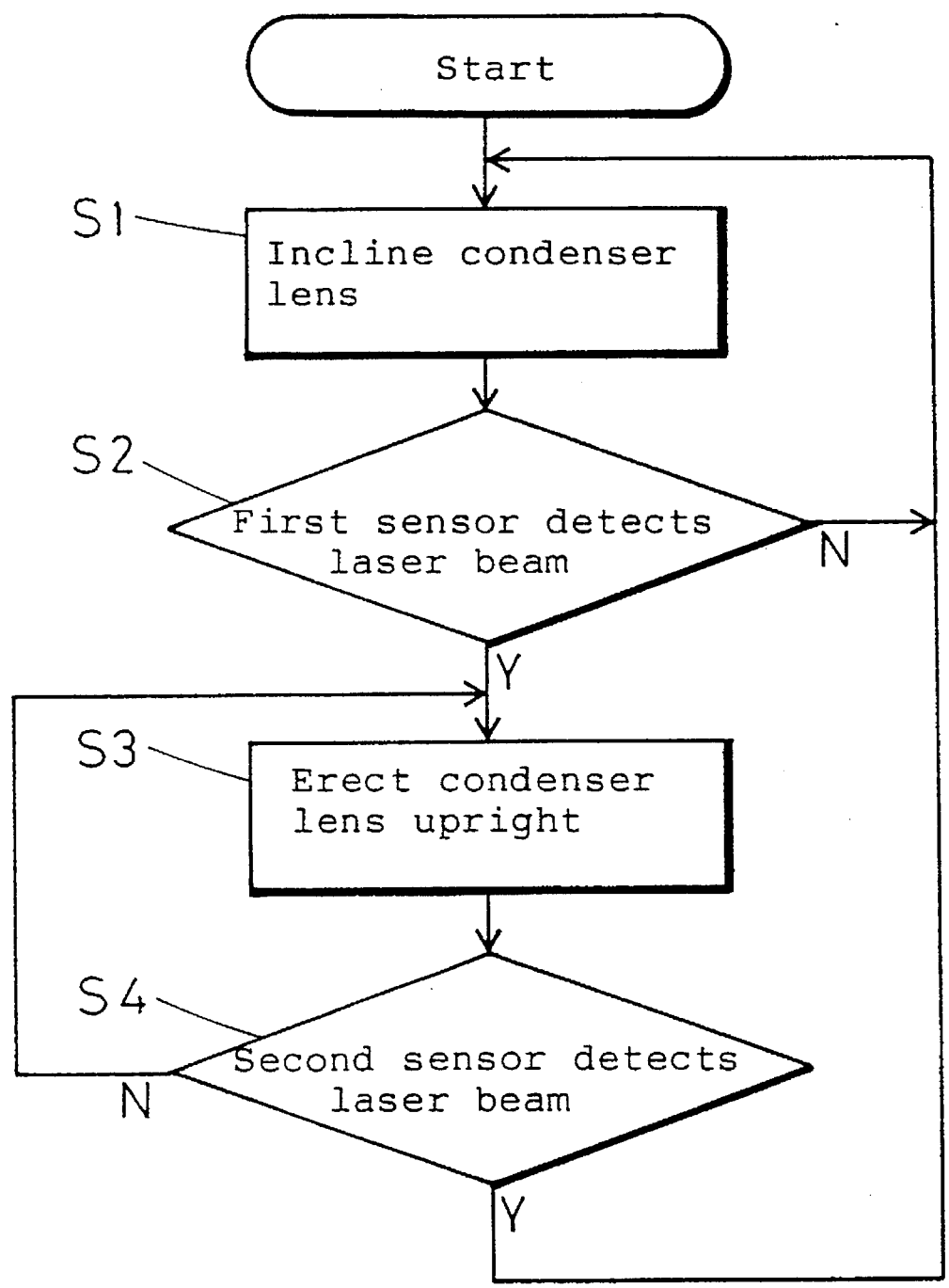
FIG. 9 is a flowchart showing control processing in the first embodiment.

FIG. 9 is a flowchart showing processing executed in the control unit 20 for controlling the inclination of the condenser lens 11. In the flowchart, S denotes each processing step.

Referring to FIG. 9, after starting of the control processing, the condenser lens 11 is kept inclined (S1 and S2) until the first laser beam sensor 6 detects the laser beam. When the first laser beam sensor 6 detects the laser beam, the condenser lens 11 is erected upright (S3) and held in this state until the second laser beam sensor 7 detects the laser beam (S4). When the second laser beam sensor 7 detects the laser beam, the above-described operation is repeated again from the start.

It should be noted that whether or not the laser beam is being scanned in the scanning direction in which it passes through the holographic diffraction plate 8 can be detected with either one of the first and second laser beam sensors 6 and 7 if the rotational speed of the polygon mirror 3 is known. That is, the scanning position can be judged from the rotational speed of the polygon mirror 3 by using only one of the first and second laser beam sensors 6 and 7.

For example, the arrangement may be such that after the condenser lens 11 has been erected upright on the basis of the beam detection by the first laser beam sensor 6, time elapsed is measured with a timer 20n ncluded in the control unit 20, and after a predetermined time has elapsed, the condenser lens 11 is inclined to attain a defocus state.

Figure 10:
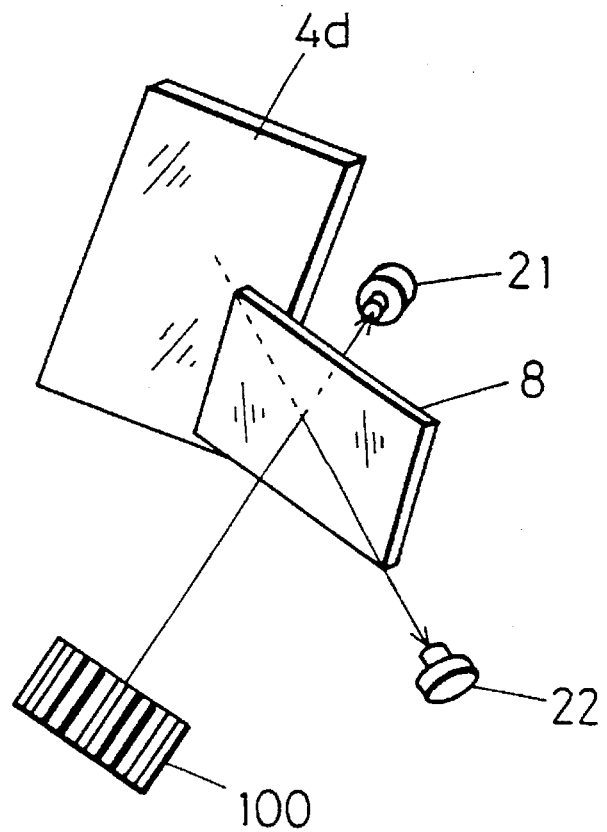
FIG. 10 is a perspective view schematically showing an essential part of a second embodiment of the present invention.

The arrangement may also be such that, as shown schematically in FIG. 10, laser beam sensors 21 and 22 that detect light of zeroth-order diffraction, which is not diffracted by the holographic diffraction plate 8, are disposed at the reverse side of the holographic diffraction plate 8 with respect to the laser beam entrance position, thereby detecting a scanning optical path.

The arrangement for reducing the intensity of the laser beam incident on the laser beam detector 13 may be embodied in various forms.

Figure 11:
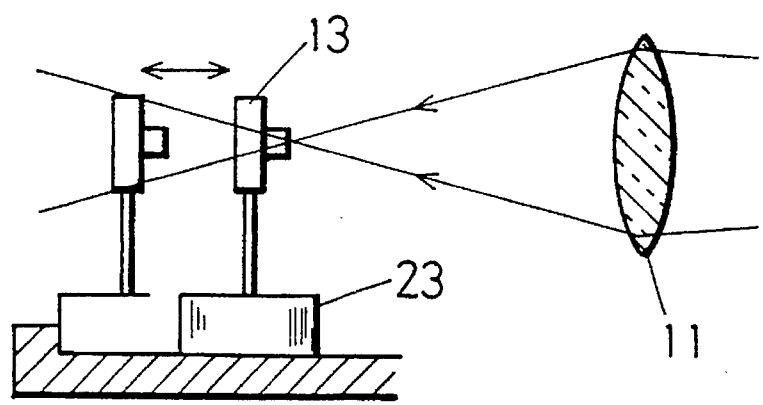
FIG. 11 is a side view schematically showing an essential part of a third embodiment of the present invention.

For example, as shown in FIG. 11, the laser beam detector 13 may be moved along the optical axis so that the light-receiving surface of the laser beam detector 13 shifts from the point of convergence of the laser beam to attain a defocus state, thereby reducing the intensity of the laser beam incident on the laser beam detector 13. In this case, the forward and backward movement of the laser beam detector 13 is allowed to follow a control signal at high speed by driving the laser beam detector 13 using, for example, a piezoelectric element 23 which is deformed upon application of a voltage.

Thus, the intensity of the laser beam incident on the laser beam detector 13 can be reduced by changing the direction or position of at least either the condenser lens 11 or the laser beam detector 13.

Figure 12:
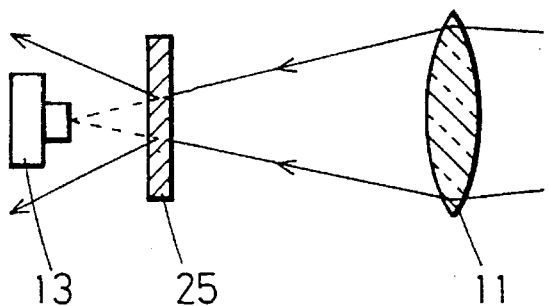
FIG. 12 is a side view schematically showing an essential part of a fourth embodiment of the present invention.

As shown in FIG. 12, a liquid crystal device 25, which is normally transparent but becomes diffractive upon application of a voltage, may be disposed in the laser beam optical path between the condenser lens 11 and the laser beam detector 13. In this case, when the liquid crystal device 25 is made diffractive by applying a voltage thereto, the laser beam is defocused on the light-receiving surface of the laser beam detector 13, resulting in a reduction in the intensity of the laser beam incident on the laser beam detector 13.

Figure 13:
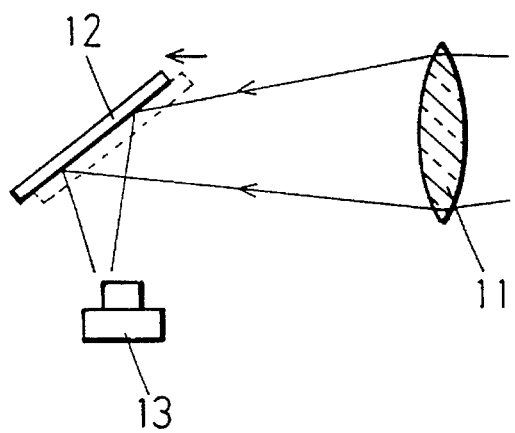
FIG. 13 is a side view schematically showing an essential part of a fifth embodiment of the present invention.

The arrangement may also be such that, as shown in FIG. 13, the mirror 12, which is disposed between the condenser lens 11 and the laser beam detector 13, is moved or inclined, thereby shifting the optical path of the laser beam so that the laser beam is defocused on the light-receiving surface of the laser beam detector 13.

Figure 14:
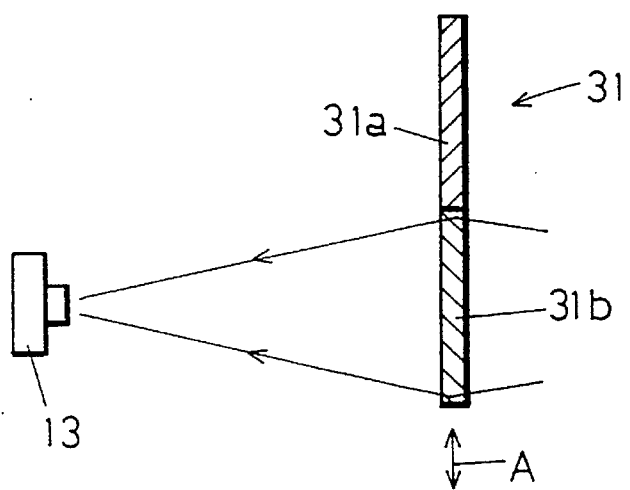
FIG. 14 is a side view schematically showing an essential part of a sixth embodiment of the present invention.
Figure 15:
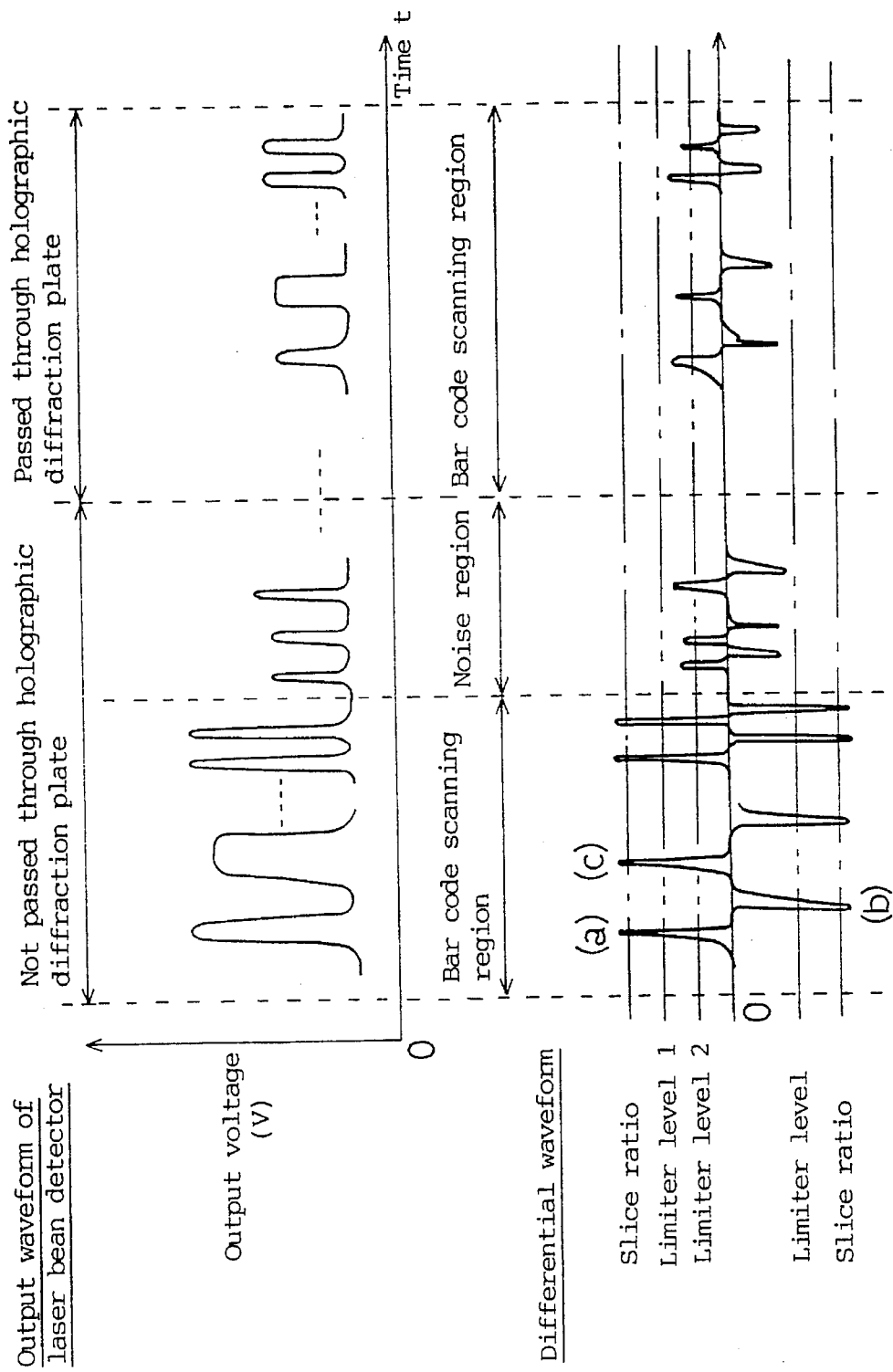
FIG. 15 shows an output signal waveform in a related art.

In addition, since a holographic diffraction plate has a light-condensing function, a holographic diffraction plate 32 may be used in place of the condenser lens 11, as shown, for example, in FIG. 14.

In this case, it is possible to make use of the nature of the holographic diffraction plate 31 that different diffraction efficiencies can be given to different regions on the surface of the holographic diffraction plate 31. That is, the arrangement may be such that one half of the holographic diffraction plate 31 is formed as a high-diffraction efficiency part 31a, and the other half as a low-diffraction efficiency part 31b, and that the holographic diffraction plate 31 is reciprocated in the directions of the arrow A perpendicular to the optical axis so that the high-diffraction efficiency part 31a and the low-diffraction efficiency part 31b alternately extends across the optical path.

It is also possible to change the inclination of the holographic diffraction plate 31 by making use of the phenomenon that the diffraction efficiency lowers as the angle of incidence of the laser beam with respect to the holographic diffraction plate 31 shifts from a reference value.

Instead of reducing the intensity of the laser beam incident on the laser beam detector by an optical technique as in the foregoing embodiments, the intensity of the laser beam emitted from the semiconductor laser 1 may be reduced by electrically controlling the semiconductor laser 1.

In a case where electrical control is effected with respect to the semiconductor laser 1, the intensity of the laser beam emitted from the semiconductor laser 1 may be increased, contrary to the above, when the laser beam detected by the laser beam detector 13 has been scanned in a scanning direction in which relatively large attenuation occurs.

Further, the present invention may also effectively be applied to an apparatus in which all scanning laser beams for reading bar code information are diffracted by holographic diffraction plates, or to an apparatus in which none of scanning laser beams pass through a holographic diffraction plate, as long as the laser beam intensity varies according to the scanning direction. For example, the present invention may be applied to an apparatus in which the number of reflections caused by mirrors differs according to the scanning direction, or the angle of incidence of the beam with respect to the window glass 53 differs considerably according to the scanning direction. In such an apparatus also, the present invention enables the read performance to be improved.

According to the present invention, the intensity of the signal beam incident on the laser beam detecting device can be maintained at a constant level irrespective of whether the laser beam for scanning a bar code is attenuated or not. Therefore, information contained in the bar code can be read readily and accurately regardless of the posture of the bar code in which it is faced toward the bar code read section.

While the invention has been described by reference to specific embodiments chosen for purposes of illustration, it should be apparent that numerous modifications could be made thereto by those skilled in the art without departing from the basic concept and scope of the invention.

We claim:

1. A laser beam scanning apparatus including a laser beam comprising:

means for scanning the laser beam;

means for changing a scanning direction of said laser beam into a plurality of different scanning directions in one of which the returning portion of the laser beam is attenuated in comparison to another returning portion of the laser beam traveling in another scanning direction;

scanning optical path detecting means for detecting whether said laser beam is being scanned in the scanning direction in which it is attenuated;

laser beam detecting means for detecting the portion of the laser beam reflected from a bar code scanned by a portion of the laser beam emanating from said scanning direction changing means; and intensity controlling means for controlling an intensity of the laser beam incident on said laser beam detecting means in response to a result of detection made by said scanning optical path detecting means:

wherein the intensity of the signal beam incident on the laser beam detecting means is controlled by the intensity controlling means so that there will be no difference in the intensity level of the signal beam incident on the laser beam detecting means whether or not the laser beam travels in the scanning direction in which it is attenuated.

2. A laser beam scanning apparatus according to claim 1, wherein said scanning direction changing means includes a holographic diffraction plate for changing the scanning direction of said laser beam by diffraction, so that the portion of the laser beam passing through said holographic diffraction plate is attenuated in comparison to the portion of the laser beam traveling in said another scanning direction.

3. A laser beam scanning apparatus according to claim 1, wherein said incident laser beam intensity control means reduces the intensity of the laser beam incident on said laser beam detecting means when the laser beam detected by said laser beam detecting means has been scanned in the scanning direction in which no attenuation occurs by said scanning direction changing means, in response to the result of detection made by said scanning optical path detecting means.

4. A laser beam scanning apparatus according to claim 1, wherein said scanning optical path detecting means has a pair of laser beam sensors for sensing a returning portion of the laser beam at both ends of a scanning range where said laser beam is attenuated.

5. A laser beam scanning apparatus according to claim 1, wherein said scanning optical path detecting means has a laser beam sensor for sensing a returning portion of the laser beam at one end of a scanning range where said laser beam is attenuated, and a timer.

6. A laser beam scanning apparatus according to claim 2, wherein said scanning optical path detecting means has a laser beam sensor for detecting light of zeroth-order diffraction, which is not diffracted by said holographic diffraction plate.

7. A laser beam scanning apparatus according to claim 1, wherein said incident laser beam intensity control means varies the intensity of the laser beam incident on said laser beam detecting means by changing a position or direction of said laser beam detecting means.

8. A laser beam scanning apparatus according to claim 1, further comprising means for converging the laser beam reflected from said bar code on said laser beam detecting means.

9. A laser beam scanning apparatus according to claim 8, wherein said incident laser beam intensity control means varies the intensity of the laser beam incident on said laser beam detecting means by changing a position or direction of said converging means.

10. A laser beam scanning apparatus according to claim 8, wherein said converging means is a holographic diffraction plate having a high-diffraction efficiency part and a low-diffraction efficiency part, and said incident laser beam intensity control means varies the intensity of the laser beam incident on said laser beam detecting means by displacing said holographic diffraction plate.

11. A laser beam scanning apparatus according to claim 1, wherein said incident laser beam intensity control means is a liquid crystal device which becomes diffractive upon application of a voltage, said liquid crystal device being provided in an optical path of the laser beam incident said laser beam detecting means.

12. A laser beam scanning apparatus according to claim 1, wherein said incident laser beam intensity control means is a device for shifting an optical path of the laser beam directed toward said laser beam detecting means.

13. A laser beam scanning apparatus according to claim 1, wherein said scanning direction changing means includes a plurality of reflecting mirrors for changing the scanning direction of said laser beam, so that the portion of the laser beam traveling in a scanning direction in which there are a relatively large number of reflections caused by said mirrors is attenuated in comparison to the portion of the laser beam traveling in a scanning direction in which there are a relatively small number of reflections.

14. A laser beam scanning apparatus according to claim 1, wherein said incident laser beam intensity control means increases the intensity of the laser beam incident on said laser beam detecting means when the laser beam detected by said laser beam detecting means has been scanned in the scanning direction in which attenuation occurs by said scanning direction changing means, in response to the result of detection made by said scanning optical path detecting means.

* * * * *